(12) United States Patent
Chen

(10) Patent No.: US 12,433,337 B2
(45) Date of Patent: Oct. 7, 2025

(54) MESH-SHAPED SHEET-TYPE POROUS HEATING AND ATOMIZING ASSEMBLY AND HEATING ATOMIZER THEREWITH

(71) Applicant: Shenzhen Huachengda Precision Industry Co. Ltd., Guangdong (CN)

(72) Inventor: Ping Chen, Guangdong (CN)

(73) Assignee: Shenzhen Huachengda Precision Industry Co. Ltd., Shenzhen (CN)

( * ) Notice: Subject to any disclaimer, the term of this patent is extended or adjusted under 35 U.S.C. 154(b) by 928 days.

(21) Appl. No.: 17/630,156

(22) PCT Filed: Jun. 1, 2020

(86) PCT No.: PCT/CN2020/093664
§ 371 (c)(1),
(2) Date: Jan. 25, 2022

(87) PCT Pub. No.: WO2021/189643
PCT Pub. Date: Sep. 30, 2021

(65) Prior Publication Data
US 2022/0287156 A1 Sep. 8, 2022

(30) Foreign Application Priority Data
Mar. 27, 2020 (CN) .......................... 202010228966.6

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/42* (2020.01); *A24F 40/44* (2020.01);
(Continued)

(58) Field of Classification Search
None
See application file for complete search history.

(56) References Cited

U.S. PATENT DOCUMENTS

2018/0140018 A1* 5/2018 Hu ........................ A24F 40/485
2020/0390149 A1* 12/2020 Hepworth ............. A24F 40/465
(Continued)

FOREIGN PATENT DOCUMENTS

CN 204317492 U 5/2015
CN 105394814 A 3/2016
(Continued)

OTHER PUBLICATIONS

Extended European Search Report of Counterpart European Patent Application No. 20926453.0 issued on Sep. 29, 2022.
(Continued)

*Primary Examiner* — John J Norton
(74) *Attorney, Agent, or Firm* — Andrew C. Cheng

(57) ABSTRACT

The disclosure discloses a mesh-shaped sheet-type porous heating and atomizing assembly, including a porous liquid conducting member to absorb and conduct liquid and a planar sheet-like electric heating track arranged in the porous liquid conducting member; wherein the mesh-shaped sheet-type porous heating and atomizing assembly comprises one or more planar sheet-like electric heating track configured to heat and atomize the liquid; one or more through airflow holes are defined in the porous liquid conducting member, and the planar sheet-like electric heating track is configured to be a planar heating net composed of one or more heating tracks connected in parallel. The disclosure further discloses a mesh-shaped sheet-type porous heating atomizer, including the mesh-shaped sheet-type porous heating and atomizing assembly. The mesh-shaped sheet-type porous heating and atomizing assembly and the heating atomizer therewith are beneficial to mass
(Continued)

production, uniform heating, large atomization area, and large amount of vapor.

18 Claims, 17 Drawing Sheets

(51) Int. Cl.
    *A24F 40/42*     (2020.01)
    *A24F 40/44*     (2020.01)
    *A24F 40/485*     (2020.01)
    *H05B 3/20*     (2006.01)

(52) U.S. Cl.
    CPC ............. *A24F 40/485* (2020.01); *H05B 3/20* (2013.01); *H05B 2203/007* (2013.01); *H05B 2203/021* (2013.01)

(56) References Cited

U.S. PATENT DOCUMENTS

| | | |
|---|---|---|
| 2022/0007724 A1 | 1/2022 | Zhang et al. |
| 2022/0287156 A1 | 9/2022 | Chen |

FOREIGN PATENT DOCUMENTS

| | | |
|---|---|---|
| CN | 108185535 A | 6/2018 |
| CN | 109152419 A | 1/2019 |
| CN | 109222245 A | 1/2019 |
| CN | 109349680 A | 2/2019 |
| CN | 109622259 A | 4/2019 |
| CN | 209715449 U | 12/2019 |
| CN | 209931509 U | 1/2020 |
| CN | 111200941 A | 5/2020 |
| EP | 2967148 A2 | 1/2016 |
| EP | 3997989 A1 | 5/2022 |
| JP | 2017524353 A | 8/2017 |
| JP | 2019513357 A | 5/2019 |
| JP | 2019528724 A | 10/2019 |
| JP | 2022539966 A | 9/2022 |
| WO | 2016061859 A1 | 4/2016 |
| WO | 2019073237 A1 | 4/2019 |
| WO | 2021189643 A1 | 9/2021 |

OTHER PUBLICATIONS

First Office Action of Counterpart Canadian Patent Application No. 3, 148,633 issued on Mar. 17, 2023.
Second Office Action of Counterpart Canadian Patent Application No. 3,148,633 issued on Feb. 19, 2024.
First Office Action of Counterpart Indonesian Patent Application No. P00202210638.
First Office Action of Counterpart Indian Patent Application No. 202237053051 issued on Jan. 31, 2023.
First Office Action of Counterpart Japanese Patent Application No. 2021-572005 issued on Mar. 7, 2023.
Second Office Action of Counterpart Japanese Patent Application No. 2021-572005 issued on Aug. 22, 2023.
International Search Report of PCT Patent Application No. PCT/CN2020/093664 issued on Dec. 29, 2020.

\* cited by examiner

MESH-SHAPED SHEET-TYPE POROUS HEATING AND ATOMIZING ASSEMBLY AND HEATING ATOMIZER THEREWITH

TECHNICAL FIELD

The present disclosure relates to an atomizing device for atomizing liquid into steam for users to inhale through microporous heating, and in particular, to a mesh-shaped sheet-type porous heating and atomizing assembly and a heating atomizer therewith.

BACKGROUND OF THE DISCLOSURE

Currently, there are two typical liquid conducting and heating methods applied in the heating and atomizing assemblies in the art. The first type is a cylindrical porous liquid conducting member that allows liquid to enter from an outer wall of the cylindrical member, and an inner wall of the cylindrical member is inlaid with a spiral or curled cylindrical mesh-shaped heating element. The heating and atomizing assembly with this type mainly has the following problems: a size tolerance of the heating element during production is large, the heating element need to be bent or coiled, the easily deformed and irregular heating element will affect heating efficiency and uniformity, and the heating element has a poor product consistency and a low product production capacity. The second type is a heating assembly having a porous material that allows liquid to enter from the top thereof and a flat mesh-shaped heating element inlaid on a bottom surface of the porous material. The heating assembly with this type mainly has the following problems: the heating area is small and thus the smoke volume is small, condensate is prone to be produced when the atomized steam contacts a shell, the heating element is prone to be separated from the porous material and thus a dry burning will be occurred to affect the user experience.

Therefore, the present disclosure provides a new technical solution to solve the existing technical problems.

SUMMARY OF THE DISCLOSURE

The purpose of the present disclosure is to provide a mesh-shaped sheet-type porous heating and atomizing assembly and a heating atomizer therewith.

The technical solution adopted by the present disclosure is to provide a mesh-shaped sheet-type porous heating and atomizing assembly, including a porous liquid conducting member configured to absorb and conduct liquid and a planar sheet-like electric heating track arranged in the porous liquid conducting member; wherein the mesh-shaped sheet-type porous heating and atomizing assembly includes one or more planar sheet-like electric heating track configured to heat and atomize the liquid; one or more through airflow holes are defined in the porous liquid conducting member, and the planar sheet-like electric heating track is configured to be a planar heating net composed of one or more heating tracks connected in parallel.

In some further embodiments, the porous liquid conducting member is provided with one or more through airflow holes extending vertically or laterally.

In some further embodiments, the through airflow hole in the porous liquid conducting member has a straight tubular shape, a taper shape with a wide upper portion and a narrow lower portion, a taper shape with a narrow upper portion and a wide lower portion, a step shape with a wide upper portion and a narrow lower portion, or a step shape with a narrow upper portion and a wide lower portion.

In some further embodiments, the through airflow holes in the porous liquid conducting member are distributed on one or two sides of one planar sheet-like electric heating track.

In some further embodiments, the through airflow holes are distributed in a cross mode of one-left one-right, or a side-by-side mode of two-left two-right when arranged on two sides of the one planar sheet-like electric heating track.

In some further embodiments, the through airflow holes in the porous liquid conducting member are distributed in between two planar sheet-like electric heating tracks.

In some further embodiments, at least one inner wall surface of the through airflow holes in the porous liquid conducting member is a flat planar surface, the planar sheet-like electric heating track is inlaid in a inner wall of the porous liquid conducting member and is approximately parallel to the flat planar inner wall surface of the through airflow holes, and a distance between the planar sheet-like electric heating track and the flat planar inner wall surface is 0-0.5 mm.

In some further embodiments, a cross section of the through airflow hole in the porous liquid conducting member is in a shape of a rectangle, a square, a triangle, a trapezoid, a semi-circle, or an ellipse.

In some further embodiments, an outline shape of the porous liquid conducting member is in a shape of a rectangle, a square, a triangle, a trapezoid, a semi-circle, or an ellipse.

In some further embodiments, multiple through airflow holes are provided in the porous liquid conducting member, and the multiple through airflow holes all have a same size, or have sizes larger in the middle and smaller on two sides thereof.

In some further embodiments, multiple through airflow holes are provided in the porous liquid conducting member, and the multiple through airflow holes are equidistantly spaced, or are distributed densely in the middle and sparsely on two sides thereof.

In some further embodiments, the planar sheet-like electric heating track is a planar heating net formed by cutting, punching, cropping, or etching a planar electrical conductive sheet material, or a planar heating net formed by bent an electrical conductive wire, or a planar heating net formed by screen printing or 3D printing conductive paste.

In some further embodiments, routes of the planar sheet-like electric heating track are arranged in square wave routes, and the planar sheet-like electric heating track includes one or more square-wave heating tracks connected in parallel between two electrodes of a heating sheet.

In some further embodiments, routes of the planar sheet-like electric heating track are arranged in W-shaped line routes, and the planar sheet-like electric heating track includes one or more W-shaped heating tracks connected in parallel between two electrodes.

In some further embodiments, the planar sheet-like electric heating track is a meshed heating track with round holes, and the meshed round holes are arranged in an array or in a staggered array.

In some further embodiments, the planar sheet-like electric heating track is a meshed heating track with square-shaped holes, and the meshed array grid is a square-shaped array grid.

In some further embodiments, the planar sheet-like electric heating track is a single S-shaped detour route, with a detour direction along a length direction or a width direction thereof; lines of the detour route are equidistantly spaced, or are distributed densely in the middle and sparsely on two sides thereof, or are distributed sparsely in the middle and densely on two sides thereof.

In some further embodiments, the planar sheet-like electric heating track of the mesh-shaped sheet-type porous heating and atomizing assembly is a single square-shaped spiral track.

In some further embodiments, two ends of the planar sheet-like electric heating track are provided with two electrical connection portions respectively, and each electrical connection portion extends from an outer wall of the porous liquid conducting member; the electrical connection portions are wire-like lead electrodes or sheet-like contact electrodes.

The present disclosure further provides a mesh-shaped sheet-type porous heating atomizer, including the mesh-shaped sheet-type porous heating and atomizing assembly.

In some further embodiments, the mesh-shaped sheet-type porous heating atomizer further includes a base and an oil reservoir, the mesh-shaped sheet-type porous heating and atomizing assembly is disposed in the oil reservoir, and the base is arranged on an opening of the oil reservoir and limits the mesh-shaped sheet-type porous heating and atomizing assembly to be within the oil reservoir, a first electrode and a second electrode are arranged on the base, and contact ends of the first electrode and the second electrode extend into the oil reservoir and are electrically connected to two ends of the planar sheet-like electric heating track, respectively.

In some further embodiments, an air inlet is defined in the base, and the air inlet is communicated with a space where the planar sheet-like electric heating track is located; an air outlet channel is defined in the oil reservoir, and the air outlet channel is communicated with the space where the planar sheet-like electric heating track is located.

In some further embodiments, electrode mounting holes are defined in the base, and the first electrode and the second electrode are respectively disposed in the electrode mounting holes.

In some further embodiments, the mesh-shaped sheet-type porous heating atomizer further includes an oil-locking silicone sleeved on an upper surface and a side portion of the mesh-shaped sheet-type porous heating and atomizing assembly, and an outer side wall of the oil-locking silicone is in a sealed connection with an inner wall of the oil reservoir.

The beneficial effects of the present disclosure: the mesh-shaped sheet-type porous heating and atomizing assembly and the heating atomizer therewith provided in the present disclosure have the advantages of facilitating mass production, realizing uniform heating, and having a large atomization area and a large amount of vapor, the product has a simple structure which is beneficial for assembly, and a good consistency in atomization effect, and solves the problems of poor consistency of the liquid conducting material, poor adjustment of the volume of oil input, lack of heating power control of each needed areas in traditional heating element, discontinuous matching of the heating area and the air flow channel, invalid heating areas existed, low efficiency in atomizing liquid using heat energy converted from electric energy of traditional heating element, and so on. The disclosure has simple design structure, fewer components, strong structural strength of each component, and is not easily deformed in the assembly process, hence, the manufactured final product has high consistency, and is conducive to automated production, and improves production efficiency.

BRIEF DESCRIPTION OF THE DRAWINGS

The present disclosure will be further described below in conjunction with the attached drawings and embodiments, and in the drawings.

DESCRIPTION OF THE EMBODIMENTS

Figure 1:
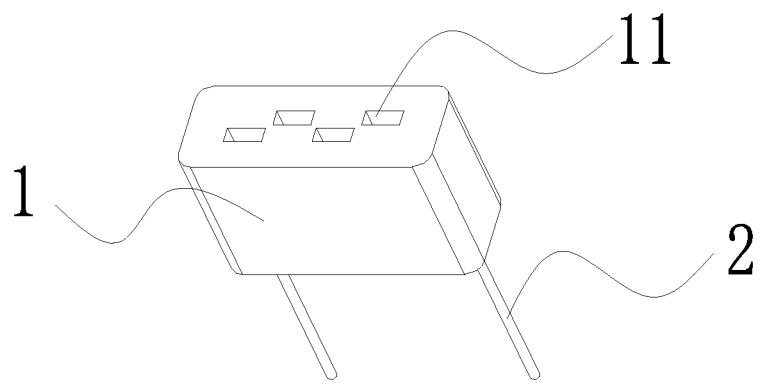
FIG. 1 is a schematic diagram of a mesh-shaped sheet-type porous heating and atomizing assembly in an embodiment of the present disclosure.

For better understanding of the technical features, objects and effects of the present disclosure, the specific embodiments of the present disclosure will now be described in detail with reference to the accompanying drawings. It can be understood that the described embodiments are merely part of the embodiments of the present disclosure rather than all of the embodiments. Based on the embodiments of the present disclosure, all other embodiments obtained by those of ordinary skill in the art without creative work should fall within the scope of protection for the present disclosure.

Please reference FIG. 1 to FIG. 39, the present disclosure provides a mesh-shaped sheet-type porous heating and atomizing assembly, including a porous liquid conducting member 1 configured to absorb and conduct liquid and a planar sheet-like electric heating track 2 arranged in the porous liquid conducting member 1. The sheet-type porous heating and atomizing assembly may be provided with one or more sheets of the planar sheet-like electric heating track 2. The planar sheet-like electric heating track 2 is used to heat and atomize the liquid. One or more through airflow holes 11 are defined in the porous liquid conducting member 1. The planar sheet-like electric heating track 2 is a planar heating net composed of one or more heating tracks connected in parallel. The porous liquid conducting member 1 is provided with one or more through airflow holes 11 extending vertically or laterally. The through airflow hole 11 in the porous liquid conducting member 1 may have a straight tubular shape, a taper shape with a wide upper portion and a narrow lower portion, a taper shape with a narrow upper portion and a wide lower portion, a step shape with a wide upper portion and a narrow lower portion, or a step shape with a narrow upper portion and a wide lower portion. The through airflow holes 11 in the porous liquid conducting member 1 are distributed on one or two sides of one planar sheet-like electric heating track 2. When the through airflow holes 11 in the porous liquid conducting member 1 are distributed on two sides of the one planar sheet-like electric heating track 2, they can be distributed in a cross mode of one-left one-right, or a side-by-side mode of two-left two-right. The through airflow holes 11 in the porous liquid conducting member 1 are distributed between two planar sheet-like electric heating tracks 2. At least one surface of inner wall surfaces of the through airflow holes 11 in the porous liquid conducting member 1 is a flat planar surface. The planar sheet-like electric heating track 2 is inlaid in an inner wall of the porous liquid conducting member 1 and is approximately parallel to the flat planar inner wall surface of the through airflow holes 11. A distance between the planar sheet-like electric heating track 2 and the flat planar inner wall surface is 0-0.5 mm. A cross section of the through airflow hole 11 in the porous liquid conducting member 1 may be in a shape of a rectangle, a square, a triangle, a trapezoid, a semi-circle, or an ellipse. The porous liquid conducting member 1 may have an outline shape of a rectangle, a square, a triangle, a trapezoid, a semi-circle, or an ellipse. When multiple through airflow holes 11 are provided in the porous liquid conducting member 1, the multiple through airflow holes 11 may all have a same size, or may have sizes larger in the middle and smaller on two sides. When multiple through airflow holes 11 are provided in the porous liquid conducting member 1, the multiple through airflow holes 11 may be equidistantly spaced, or may be distributed densely in the middle and sparsely on the two sides. The planar sheet-like electric heating track 2 is a planar heating net formed by cutting, punching, cropping, or etching a planar electrical conductive sheet material, a planar heating net formed by bent electrical conductive wires, or a planar heating net formed by screen printing or 3D printing conductive paste. The routes of the planar sheet-like electric heating track 2 may be arranged in square wave routes, and one or more square-wave heating tracks connected in parallel may be provided between two electrodes of the heating sheet. The routes of the planar sheet-like electric heating track 2 may be in W-shaped line shapes, and one or more W-shaped heating track routes connected in parallel may be provided between two electrodes. The planar sheet-like electric heating track 2 is a meshed heating track with round holes, and the meshed round holes are arranged in an array or in a staggered array. The planar sheet-like electric heating track 2 may be a meshed heating track with square-shaped holes, and the meshed holes are arranged in square-shaped array grids. The planar sheet-like electric heating track 2 is a single S-shaped detour route, and the detour direction is along a length direction or a width direction thereof, lines of the detour route may be equidistantly spaced, or may be distributed densely in the middle and sparsely on the two sides, or may be distributed sparsely in the middle and densely on the two sides. The planar sheet-like electric heating track 2 may be a single square-shaped spiral track route. Two ends of the planar sheet-like electric heating track 2 are respectively provided with two electrical connection portions. Each electrical connection portion extends from an outer wall of the porous liquid conducting member 1. The electrical connection portions can be wire-like lead electrodes or sheet-like contact electrodes.

Please reference FIG. 30 to FIG. 33, the present disclosure further provides a mesh-shaped sheet-type porous heating atomizer including the mesh-shaped sheet-type porous heating and atomizing assembly 3. The mesh-shaped sheet-type porous heating atomizer further includes a base 4 and an oil reservoir 5. The mesh-shaped sheet-type porous heating and atomizing assembly 3 is installed within the oil reservoir 5. The base 4 is arranged on an opening of the oil reservoir 5 and limits the mesh-shaped sheet-type porous heating and atomizing assembly 3 to be within the oil reservoir 5. A first electrode 61 and a second electrode 62 are arranged on the base 4. Contact ends of the first electrode 61 and second electrode 62 extend into the oil reservoir 5 and are electrically connected to the two ends of the planar sheet-like electric heating track 2, respectively. An air inlet 41 is provided in the base 4. The air inlet 41 is communicated with a space where the planar sheet-like electric heating track 2 is located. An air outlet channel 51 is defined in the oil reservoir 5. The air outlet channel 51 is communicated with the space where the planar sheet-like electric heating track 2 is located. Electrode mounting holes 42 are defined in the base 4. The first electrode 61 and second electrode 62 are respectively disposed in the electrode mounting holes 42. The mesh-shaped sheet-type porous heating atomizer further includes an oil-locking silicone 7. The oil-locking silicone 7 is sleeved on an upper surface and a side portion of the mesh-shaped sheet-type porous heating and atomizing assembly 3. An outer side wall of the oil-locking silicone 7 is in a sealed connection with an inner wall of the oil reservoir 5.

Figure 2:
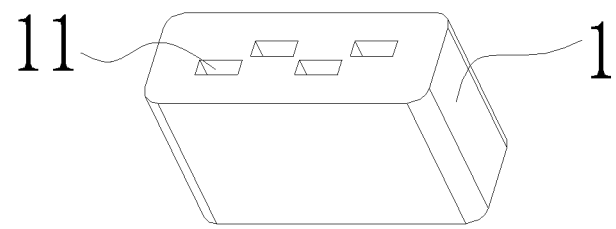
FIG. 2 is an exploded view of the mesh-shaped sheet-type porous heating and atomizing assembly shown in FIG. 1.
Figure 2:
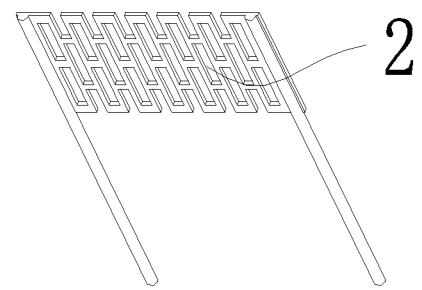

FIG. 1 and FIG. 2 show a mesh-shaped sheet-type porous heating and atomizing assembly 3 in some embodiments of the present disclosure. The heating and atomizing assembly can be applied in an atomizer to heat and atomize liquid, and includes a porous liquid conducting member 1 used to conduct liquid and a planar sheet-like electric heating track 2 for heating and atomizing the liquid. The planar sheet-like electric heating track 2 is a planar sheet-like heating sheet composed of one or more heating tracks. The planar sheet-like electric heating track 2 has advantages of a faster heating speed, a uniform heating, and a high thermal efficiency, etc. One or more through airflow holes are defined in the porous liquid conducting member 1. An inner wall surface of the through airflow hole 11 is a flat planar surface and is approximately parallel to the planar sheet-like electric heating track 2. When the planar sheet-like electric heating track 2 starts to heat, the heat will atomize the liquid into steam, which will be transferred out via the through airflow holes 11.

Figure 3:
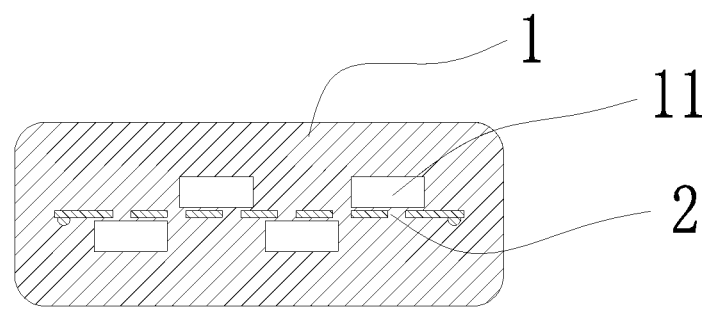
FIG. 3 is a cross-sectional view of the mesh-shaped sheet-type porous heating and atomizing assembly shown in FIG. 1.
Figure 4:
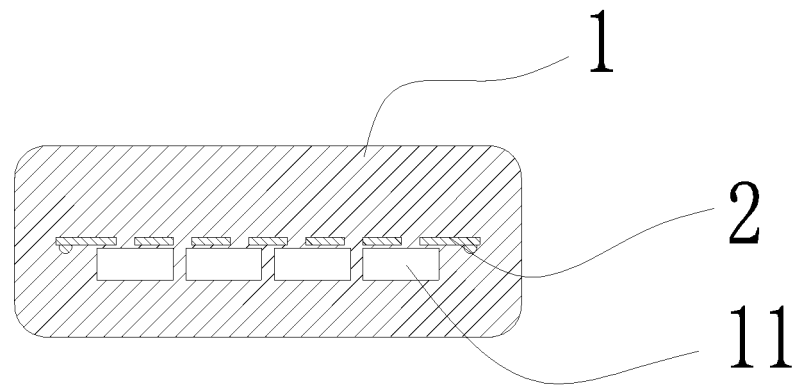
FIG. 4 is a different arrangement of through airflow holes in a first alternative solution of the mesh-shaped sheet-type porous heating and atomizing assembly shown in FIG. 3.
Figure 5:
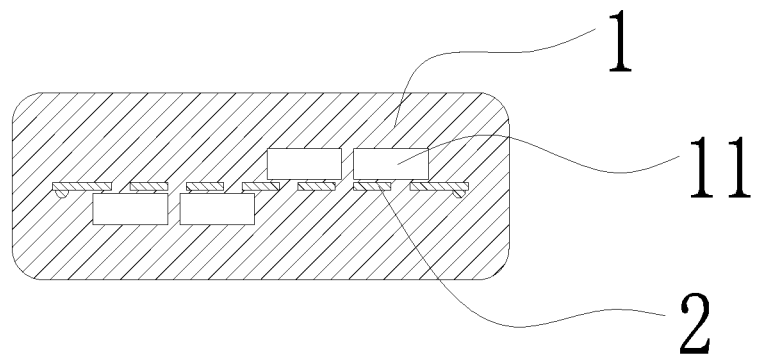
FIG. 5 is a different arrangement of the through airflow holes in a second alternative solution of the mesh-shaped sheet-type porous heating and atomizing assembly shown in FIG. 3.

FIG. 3 to FIG. 5 are schematic diagrams of arrangements of the through airflow holes 11 inside the porous liquid conducting member 1 when the porous liquid conducting member 1 is provided with multiple through airflow holes 11 of the present disclosure. When multiple through airflow holes 11 are provided, the arrangement of the through airflow holes 11 can be adjusted according to a position and a size of a liquid inlet hole of the silicone. When the heating area is relatively large, the through airflow holes 11 can be divided into multiple arrangements in the porous liquid conducting member 1. When the through airflow hole 11 has a relatively small size, the through airflow holes 11 can be preferably distributed on one side of the planar sheet-like electric heating track 2 (as shown in FIG. 4). In this way, the liquid inlet holes can be arranged at one side, which can save space for the atomizer. When the heating area is relatively large, and a thickness of the planar sheet-like electric heating track 2 is relatively small, such as less than 0.08 mm, the through airflow holes 11 are distributed on two sides of the planar sheet-like electric heating track 2 (as shown in FIG. 3), in order to ensure that the planar sheet-like electric heating track 2 is not deformed in the porous liquid conducting member 1. In this way, the through airflow holes 11 on two sides can fix the planar sheet-like electric heating track 2 during manufacturing and production, which prevents the deformation from causing uneven heating and resulting in poor atomization effect.

Figure 6:
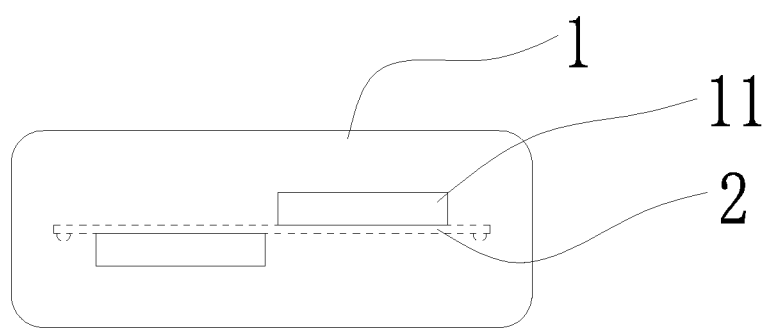
FIG. 6 is a schematic diagram of a positional relationship between the through airflow holes and a planar sheet-like electric heating track of the mesh-shaped sheet-type porous heating and atomizing assembly shown in FIG. 3.
Figure 7:
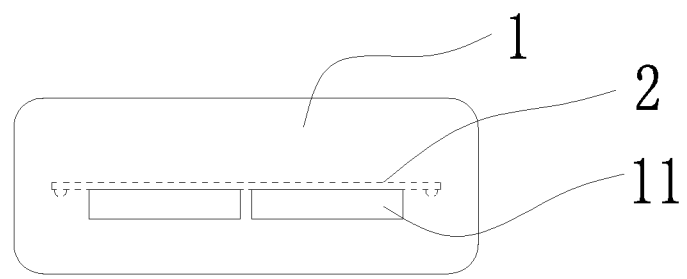
FIG. 7 is a schematic diagram of a first alternative solution to the positional relationship between the through airflow holes and the planar sheet-like electric heating track of the mesh-shaped sheet-type porous heating and atomizing assembly shown in FIG. 6.
Figure 8:
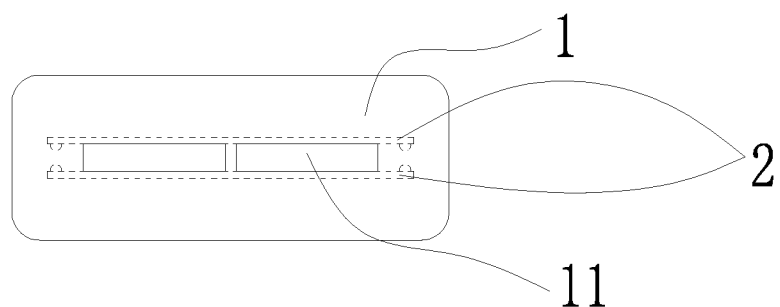
FIG. 8 is a schematic diagram of a second alternative solution to the positional relationship between the through airflow holes and the planar sheet-like electric heating track of the mesh-shaped sheet-type porous heating and atomizing assembly shown in FIG. 6.
Figure 9:
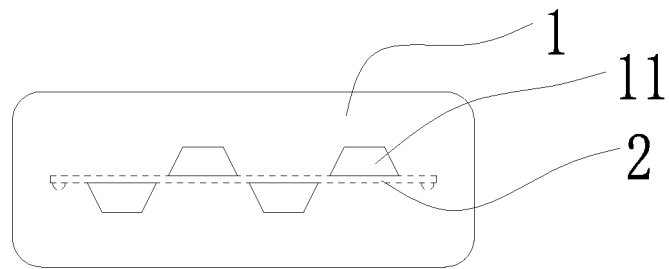
FIG. 9 is a schematic diagram of a first alternative solution to a shape of the through airflow holes and the position of the planar sheet-like electric heating track shown in FIG. 3.
Figure 10:
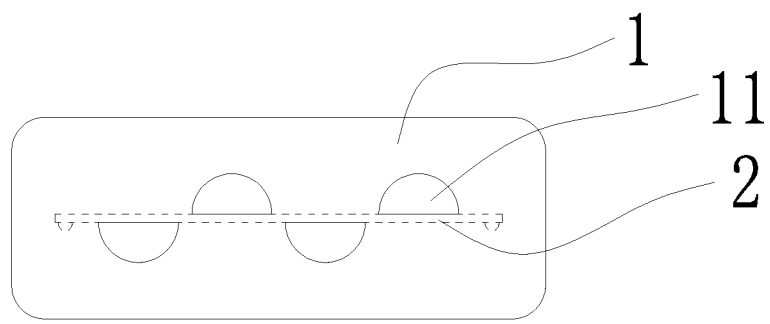
FIG. 10 is a schematic diagram of a second alternative solution to the shape of the through airflow holes and the position of the planar sheet-like electric heating track shown in FIG. 3.
Figure 11:
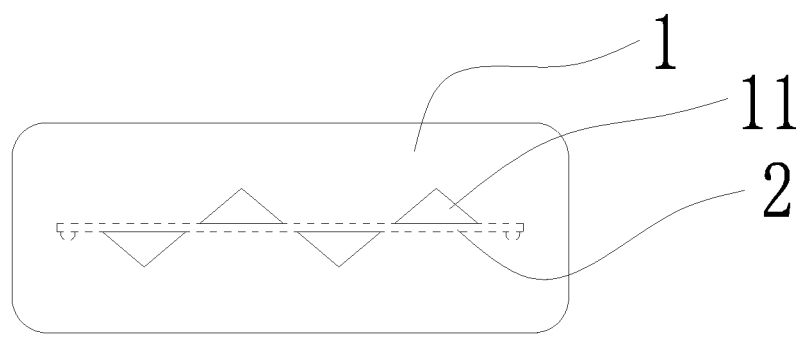
FIG. 11 is a schematic diagram of a third alternative solution to the shape of the through airflow holes and the position of the planar sheet-like electric heating track shown in FIG. 3.
Figure 12:
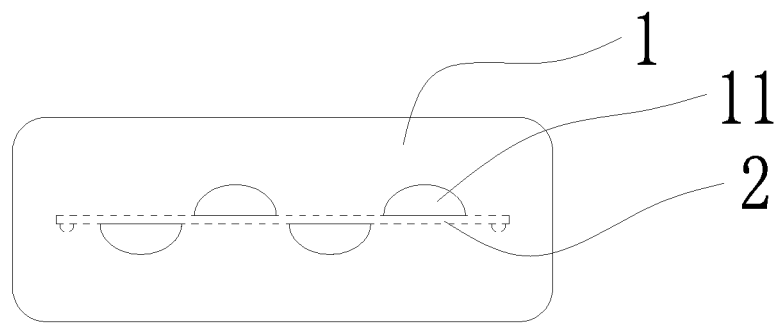
FIG. 12 is a schematic diagram of a fourth alternative solution to the shape of the through airflow holes and the position of the planar sheet-like electric heating track shown in FIG. 3.

FIG. 6 to FIG. 8 are schematic diagrams of positional relationships between the through airflow holes 11 and the planar sheet-like electric heating track 2 of the present disclosure. According to the position distribution of the liquid inlet holes in the silicone, the distribution of the through airflow holes 11 will change accordingly. When the liquid inlet holes of the silicone are located on one side thereof, the through airflow holes 11 are arranged on another side of the heating sheet (FIG. 7). When the liquid inlet holes of the silicone are located on two sides, the through airflow holes 11 are arranged on two sides of the heating sheet (FIG. 6). When in high demand of heat and atomized steam, two planar sheet-like electric heating tracks 2 can be preferably used to increase the atomization, and the through airflow holes 11 are arranged between the two heating sheets.

Figure 13:
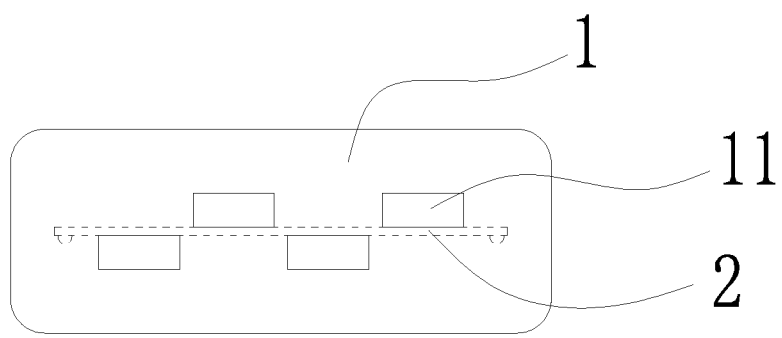
FIG. 13 is a schematic diagram of a first alternative solution to a planar inner wall surface of the through airflow hole and the position of the planar sheet-like electric heating track shown in FIG. 3.
Figure 14:
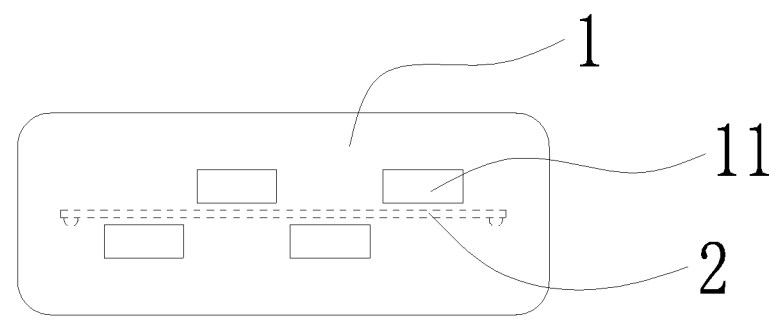
FIG. 14 is a schematic diagram of a second alternative solution to the planar inner wall surface of the through airflow hole and the position of the planar sheet-like electric heating track shown in FIG. 3.
Figure 15:
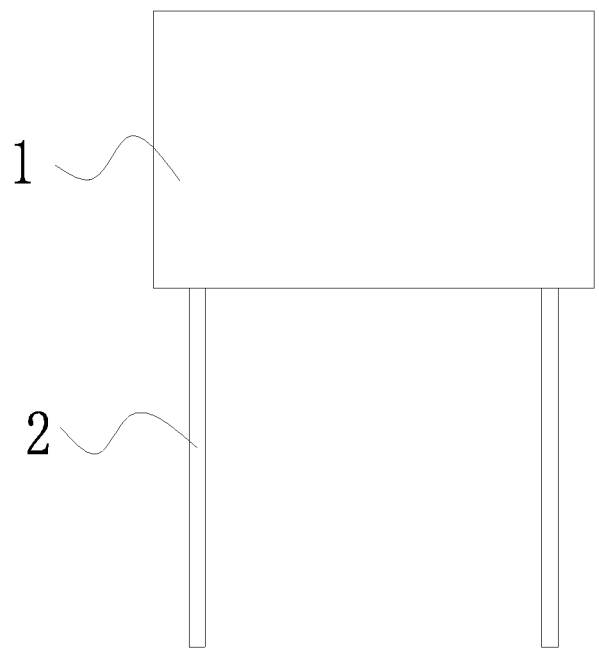
FIG. 15 is a schematic diagram of a wire connection mode of the mesh-shaped sheet-type porous heating and atomizing assembly shown in FIG. 1.
Figure 16:
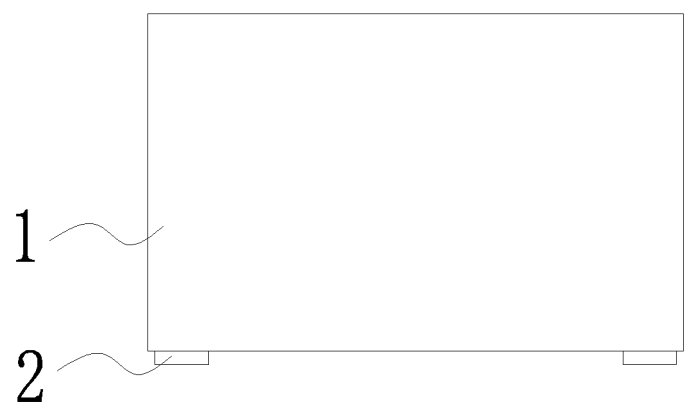
FIG. 16 is a schematic diagram of an electrode contact connection mode of the mesh-shaped sheet-type porous heating and atomizing assembly shown in FIG. 1.
Figure 17:
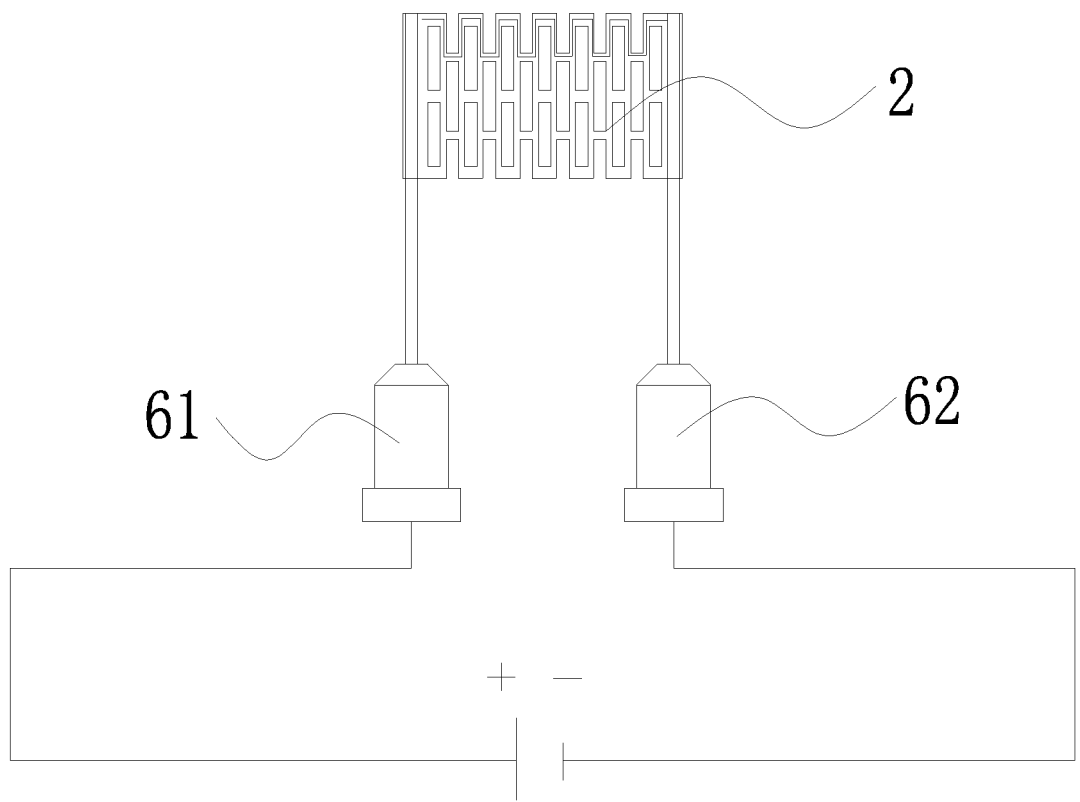
FIG. 17 is a schematic diagram of a circuit trajectory and a heating principle of planar sheet-like electric heating track shown in FIG. 2.
Figure 18:
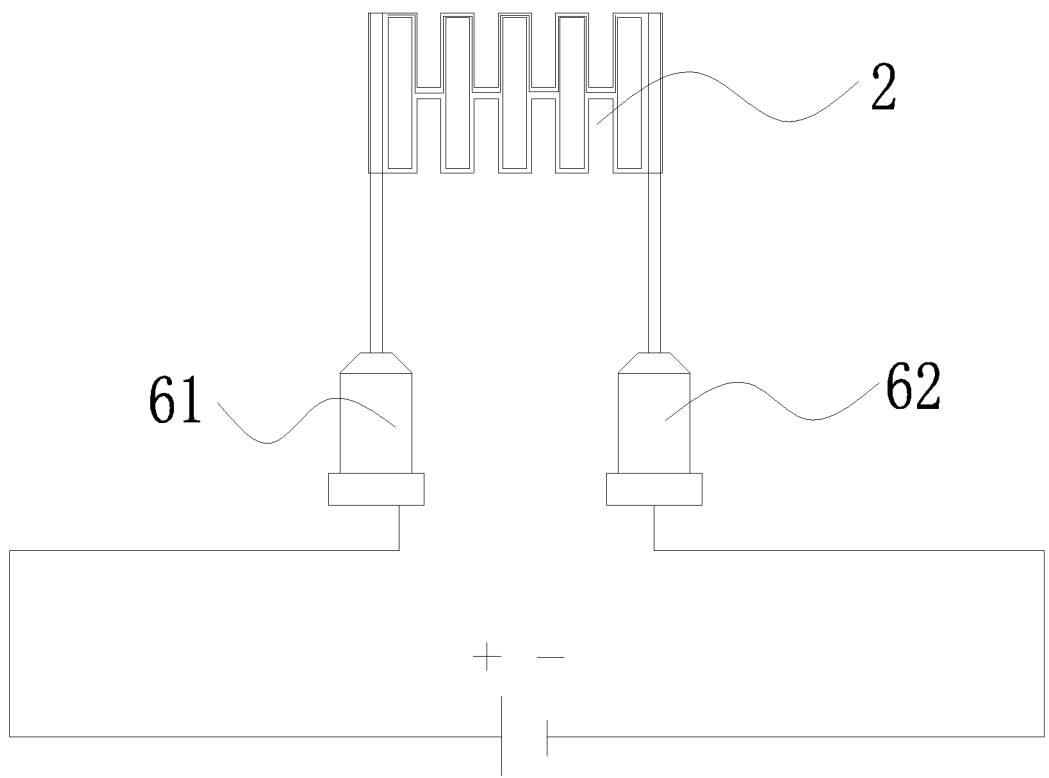
FIG. 18 is a schematic diagram of a first alternative solution to the circuit trajectory and the heating principle of planar sheet-like electric heating track shown in FIG. 2.
Figure 19:
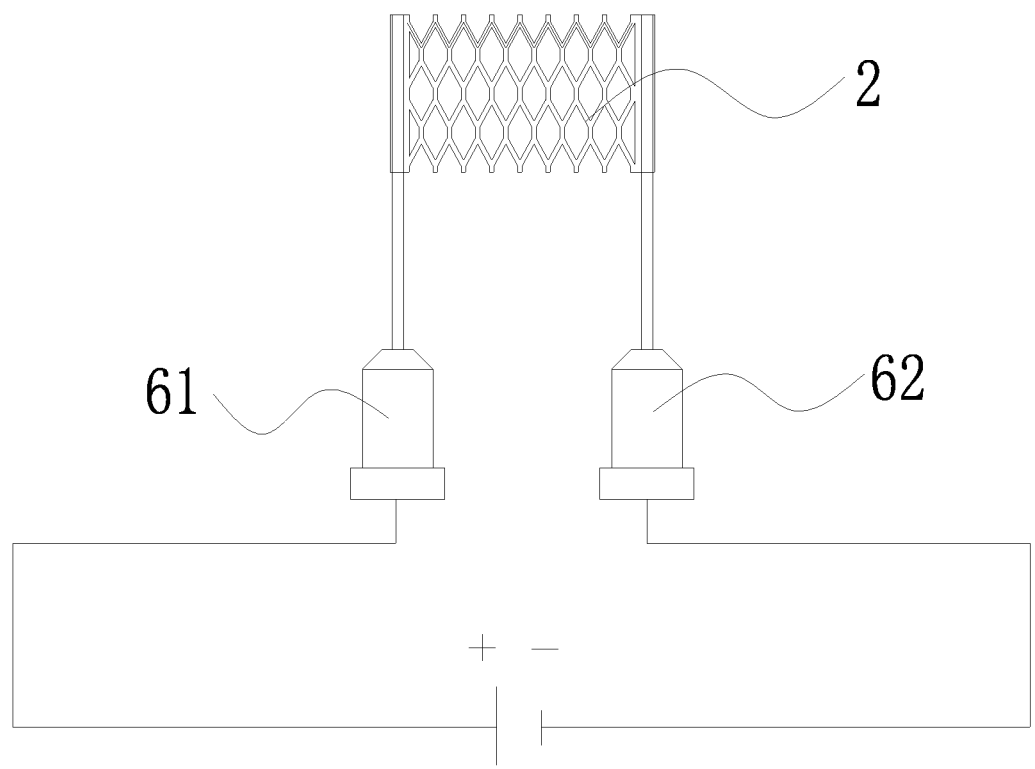
FIG. 19 is a schematic diagram of a second alternative solution to the circuit trajectory and the heating principle of planar sheet-like electric heating track shown in FIG. 2.
Figure 20:
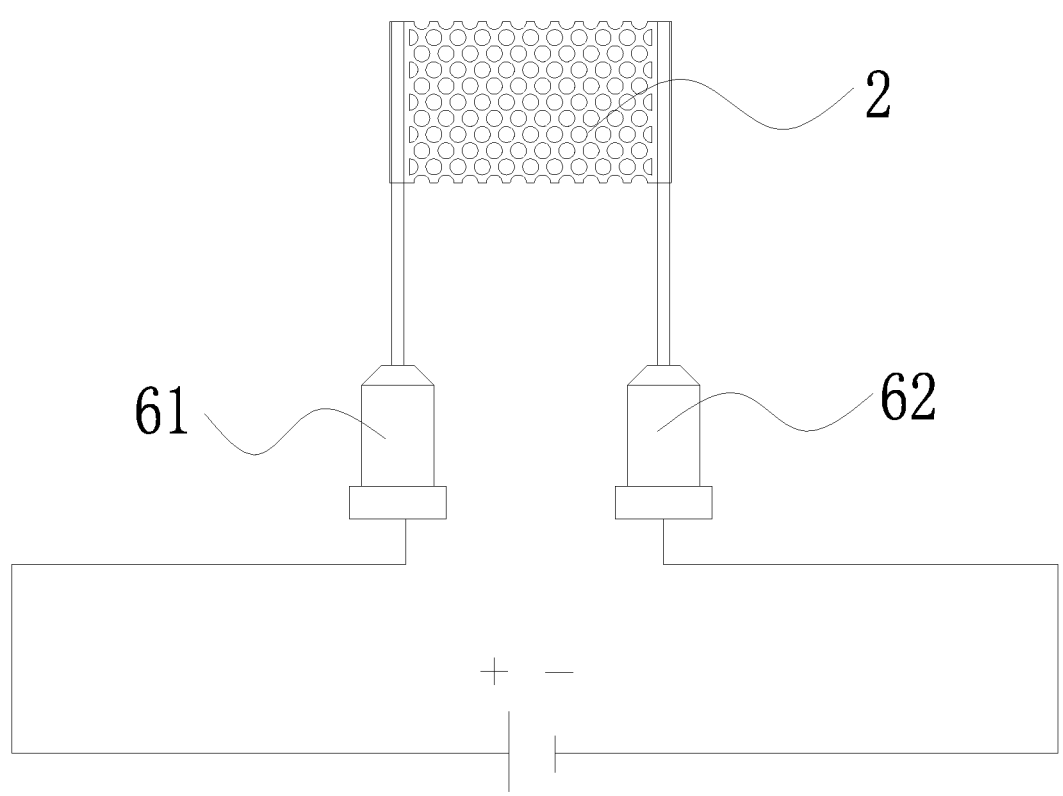
FIG. 20 is a schematic diagram of a third alternative solution to the circuit trajectory and the heating principle of planar sheet-like electric heating track shown in FIG. 2.
Figure 21:
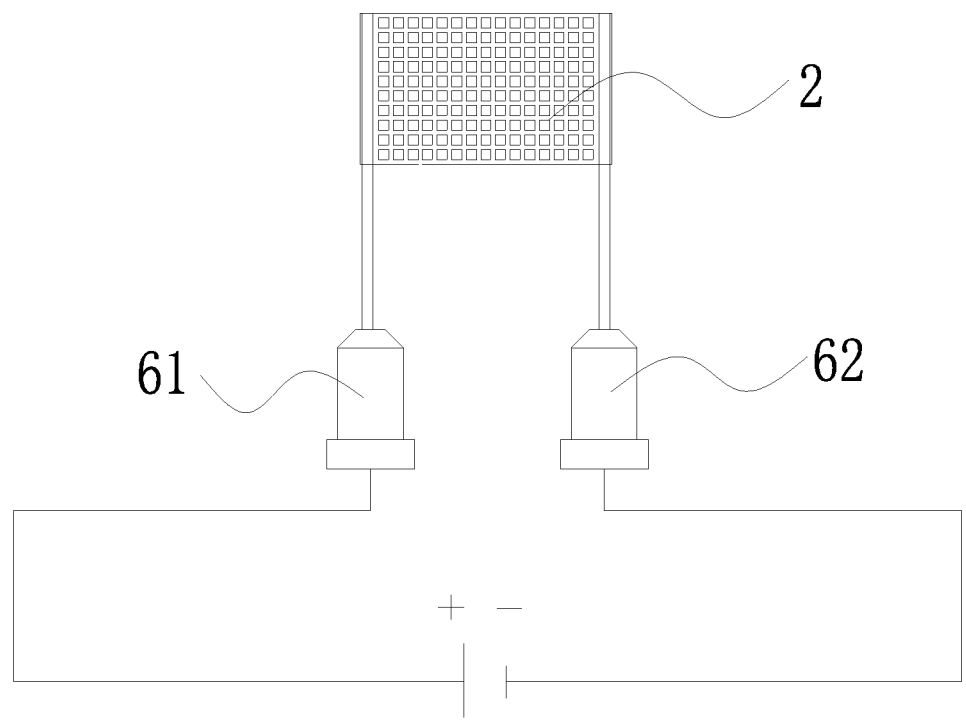
FIG. 21 is a schematic diagram of a fourth alternative solution to the circuit trajectory and the heating principle of planar sheet-like electric heating track shown in FIG. 2.
Figure 22:
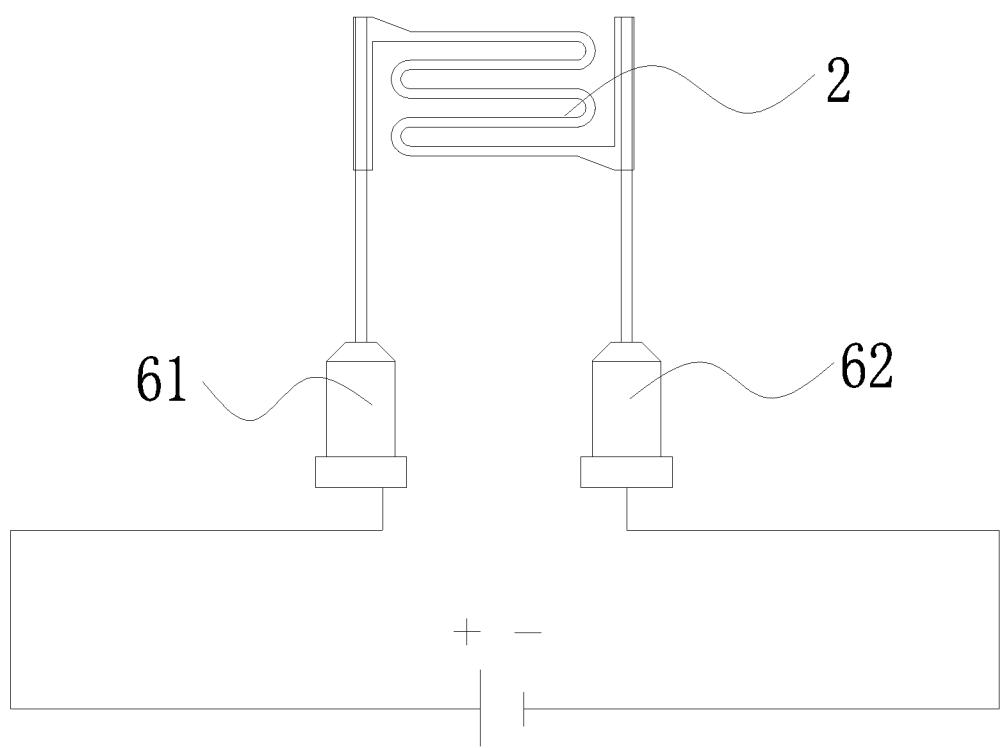
FIG. 22 is a schematic diagram of a fifth alternative solution to the circuit trajectory and the heating principle of planar sheet-like electric heating track shown in FIG. 2.
Figure 23:
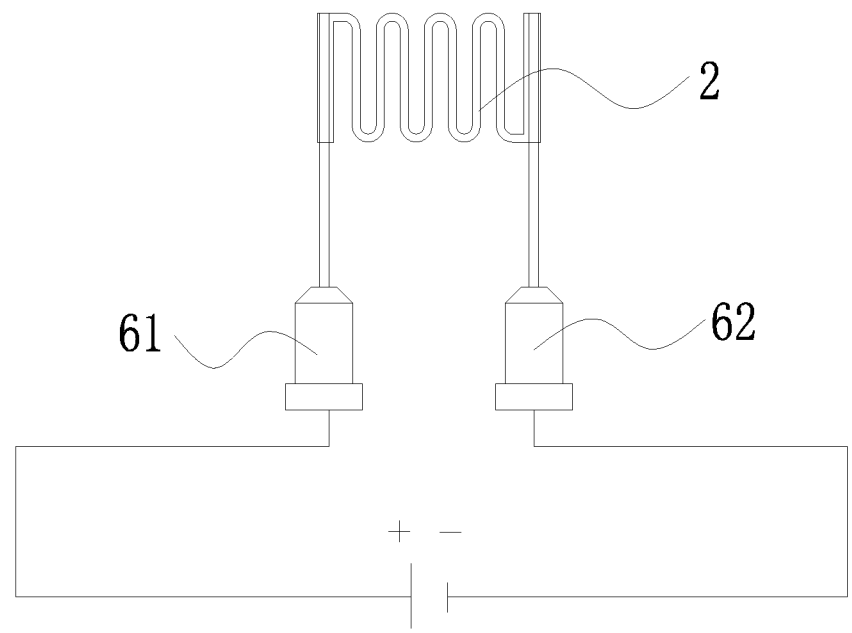
FIG. 23 is a schematic diagram of a sixth alternative solution to the circuit trajectory and the heating principle of planar sheet-like electric heating track shown in FIG. 2.
Figure 24:
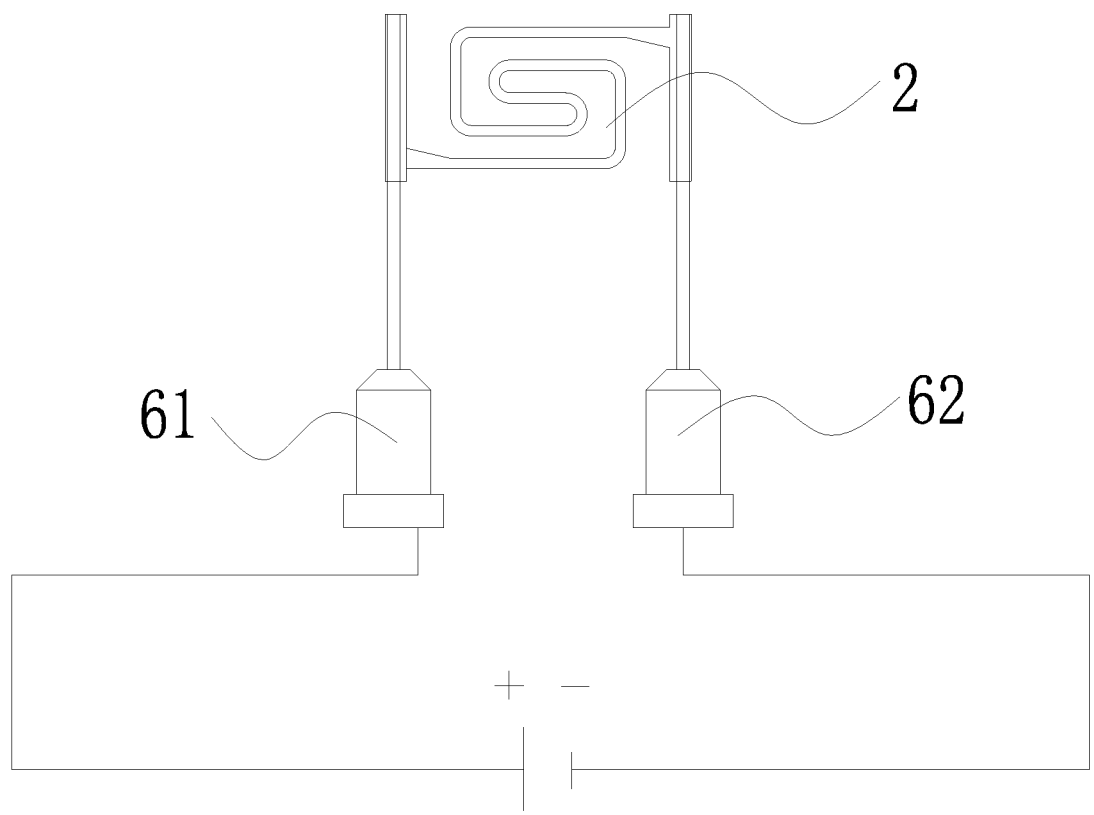
FIG. 24 is a schematic diagram of a seventh alternative solution to the circuit trajectory and the heating principle of planar sheet-like electric heating track shown in FIG. 2.

FIG. 13 to FIG. 14 are schematic diagrams of the distance relationship between the planar sheet-like electric heating track 2 and the flat planar inner wall surface of the through airflow hole 11 of the present disclosure. In some practical cases, the atomization effect is best and the atomization heat efficiency is relatively high when the plane of the planar sheet-like electric heating track 2 is flush with the flat planar inner wall surface of the through airflow hole 11, but there will be gaps between the planar sheet-like electric heating track 2 and the porous liquid conducting member 1, which will have problems like dry burning due to insufficient oil supply. When the planar sheet-like electric heating track 2 is completely buried in the porous liquid conducting member 1 and is far away from the flat planar inner wall surface of the through airflow hole, the heat needs to be conducted through the porous liquid conducting member 1 to the inner wall of the through airflow hole to produce atomized steam, which will cause low thermal efficiency, low atomized steam volume, high heat loss and other problems. The distance between the plane of the planar sheet-like electric heating track 2 and the flat planar inner wall surface of the through airflow hole 11 is preferred 0-0.5 mm. The most suitable distance can be adjusted according to comprehensive factors such as a structural strength, a thickness and a strength of the planar sheet-like electric heating track 2 and so on.

FIG. 17 to FIG. 24 show several different forms of the planar sheet-like electric heating track 2 of the present disclosure. In some embodiments, the extending direction of the heating circuit and the grid connection mode can be adjusted according to the output power of the circuit combined with the required heating areas. In some applications with a large power and a large heating area, it is preferable to use the meshed type or grid type planar sheet-like electric heating track 2 shown in FIG. 19, FIG. 20 and FIG. 21. This type of planar sheet-like electric heating track 2 is configured as multiple heating routes connected in parallel, which provides a smaller resistance value, a large cross-sectional area of the track, a uniform heating, and a high power capacity. In some applications with a low power, it is preferable to use the detour single heating track shown in FIG. 22, FIG. 23 and FIG. 24. This type of planar sheet-like electric heating track 2 is configured to be a single heating route with a large resistance value, a small cross-sectional area of the track and a low power capacity.

Figure 25:
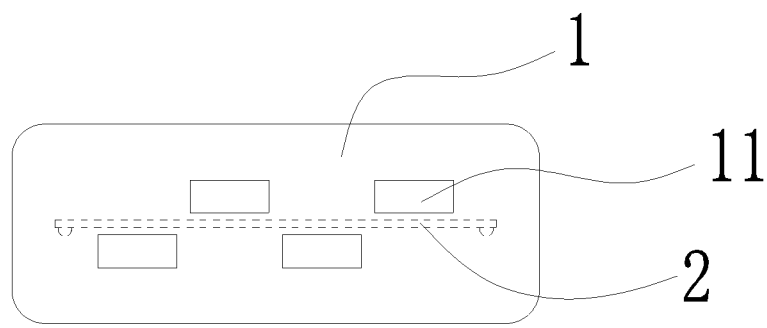
FIG. 25 is a schematic diagram of sizes and arrangement spacings of the through airflow holes shown in FIG. 3.

In some embodiments, if the sizes of the through airflow holes 11 are exactly matched with the suction volume when suction, the planar sheet-like electric heating track 2 heats uniformly. While when multiple through airflow holes 11 are provided, the through airflow holes 11 can be preferably distributed as shown in FIG. 25, in which the airflow holes are of the same size and are evenly distributed.

Figure 26:
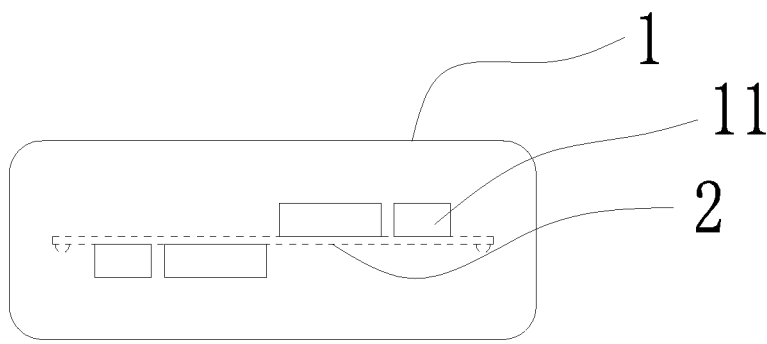
FIG. 26 is a schematic diagram of a first alternative solution to the sizes and the arrangement spacings of the through airflow holes shown in FIG. 3.
Figure 27:
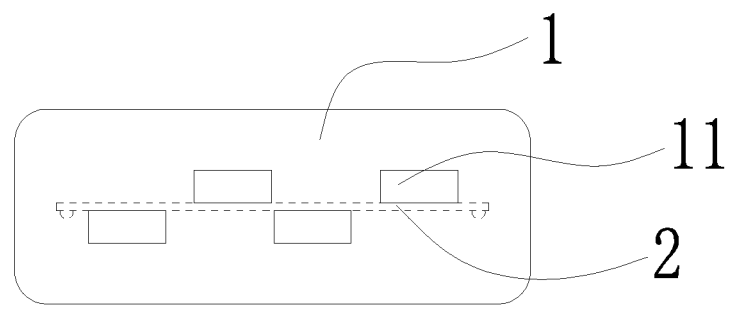
FIG. 27 is a schematic diagram of a second alternative solution to the sizes and the arrangement spacings of the through airflow holes shown in FIG. 3.

In some embodiments, the planar sheet-like electric heating track 2 exhibits a rapid heat generation at the middle portion and a slow heat generation at the two sides due to the principle of heat radiation. Thus the through airflow holes 11 can be preferably distributed as shown in FIG. 26, in which the airflow holes are distributed with a large volume in the middle portion and a small volume on the two sides.

In some embodiments, in order to maximize the thermal efficiency of the porous heating and atomizing assembly, the atomization area should be maximized while ensuring the strength thereof. Since the heat in the middle is slightly higher than that on the two sides, the through airflow holes 11 can be distributed preferably according to FIG. 27, in which the through airflow holes 11 are densely arranged in the middle and sparsely arranged on the two sides.

Figure 28:
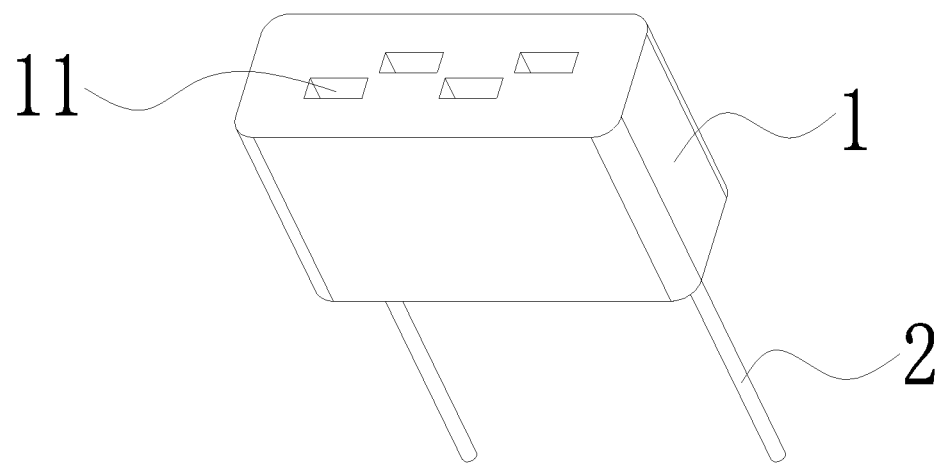
FIG. 28 is a schematic diagram of directions of the through airflow holes in the mesh-shaped sheet-type porous heating and atomizing assembly shown in FIG. 1.
Figure 29:
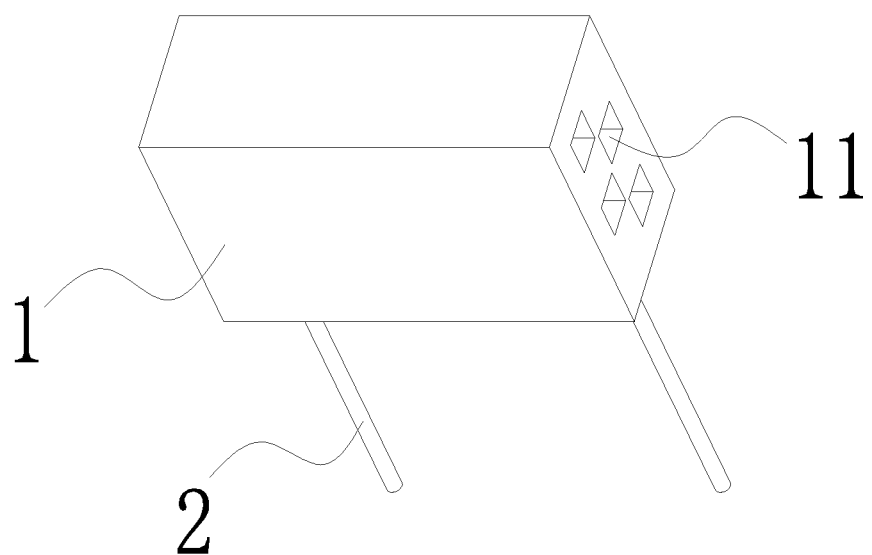
FIG. 29 is a schematic diagram of a first alternative solution to the directions of the through airflow holes in the mesh-shaped sheet-type porous heating and atomizing assembly shown in FIG. 1.

In some embodiments, considering the overall design of the atomizer, the through airflow holes 11 generally extend vertically as shown in FIG. 28. The advantage of this design is that the atomized steam has a shorter path in the atomizer, the atomized steam is less in contact with the inner wall of the airflow channel in the atomizer, thus the condensate generated is less. In some embodiments, when the power is relatively high, the temperature of the atomized steam is relatively high, or some special air inlet structure is provided, the through airflow holes 11 can be preferably selected as the transverse through airflow holes 11 shown in FIG. 29, in which airflow enters from one side and exits from another side thereof.

Figure 34:
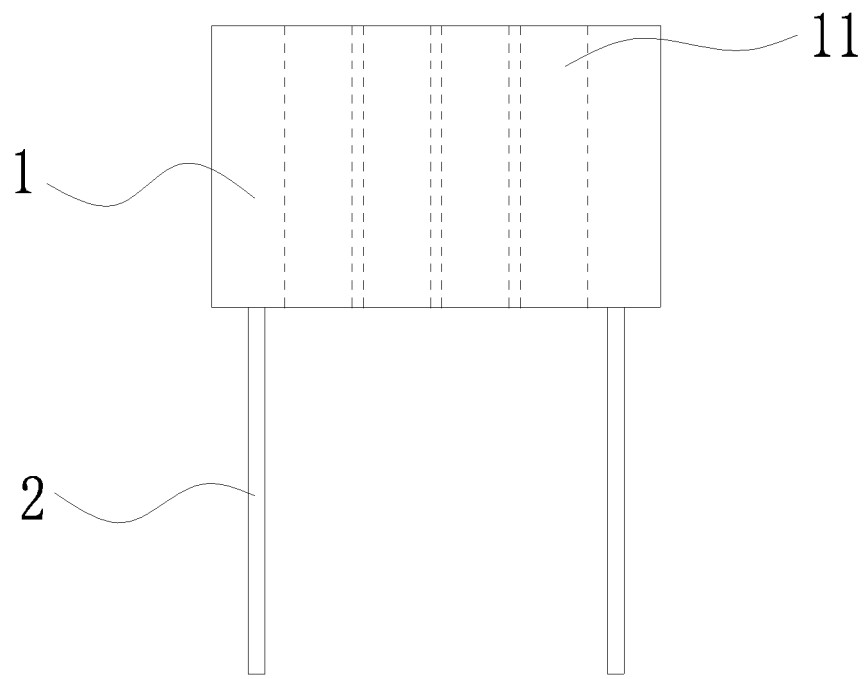
FIG. 34 is a front view of internal shapes of the through airflow holes shown in FIG. 1.
Figure 35:
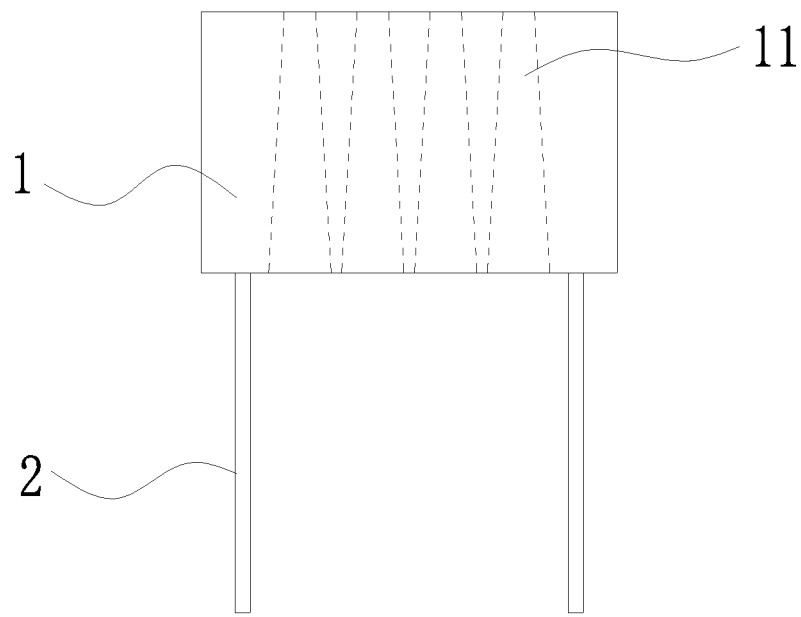
FIG. 35 is a front view of a first alternative solution to the internal shapes of the through airflow holes shown in FIG. 1.

In some embodiments, the through airflow holes 11 preferably extend vertically, and may be straight tubular as shown in FIG. 34, so that the airflow channel can maximize the space to expose the planar sheet-like electric heating track 2 in the through airflow holes 11, making the atomization area larger and the heat utilization rate the highest. But in some designs, when the through airflow holes 11 has larger areas and thus the atomized steam is more dispersed, the through airflow hole 11 may have a taper shape with a narrow upper portion and a wide lower portion as shown in FIG. 35. Thus the through airflow holes 11 can effectively gather the atomized steam, making the atomized steam more concentrated and fully atomized.

Figure 36:
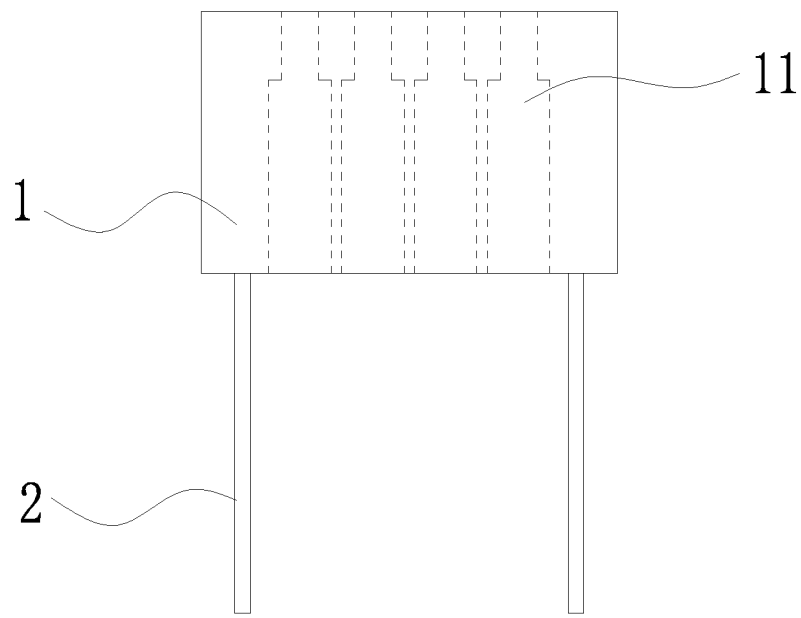
FIG. 36 is a front view of a second alternative solution to the internal shapes of the through airflow holes shown in FIG. 1.

In some embodiment, as shown in FIG. 36 as the second alternative of the through airflow hole 11 in the front view, the through airflow hole 11 has a step shape with a narrow upper portion and a wide lower portion. The through airflow hole 11 with this structure can also solve the dispersion problem of the atomized steam while fully maximizing the atomization area, so that the atomization steam is more concentrated and full. In the actual experimental verification, this structure can better solve the dispersion problem of atomized steam, making the atomized steam more dense and full.

Figure 37:
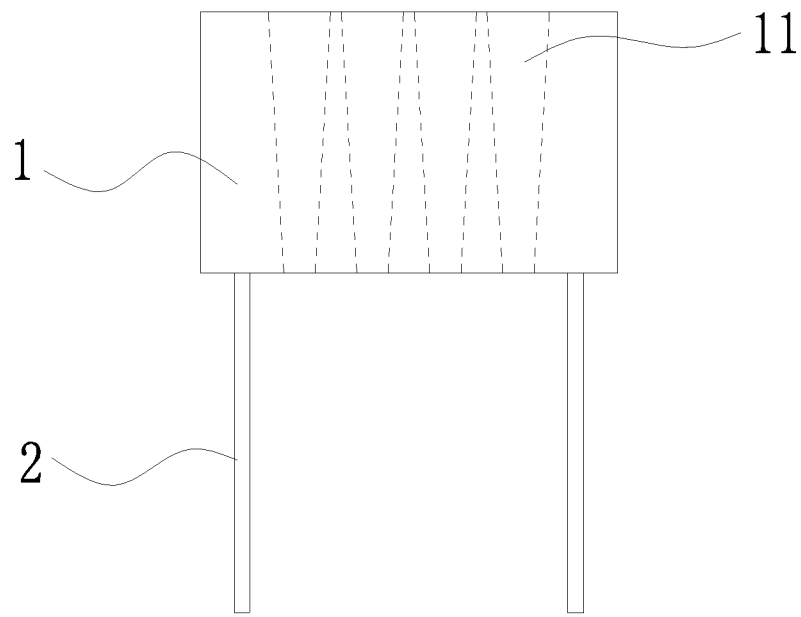
FIG. 37 is a front view of a third alternative solution to the internal shapes of the through airflow holes shown in FIG. 1.
Figure 38:
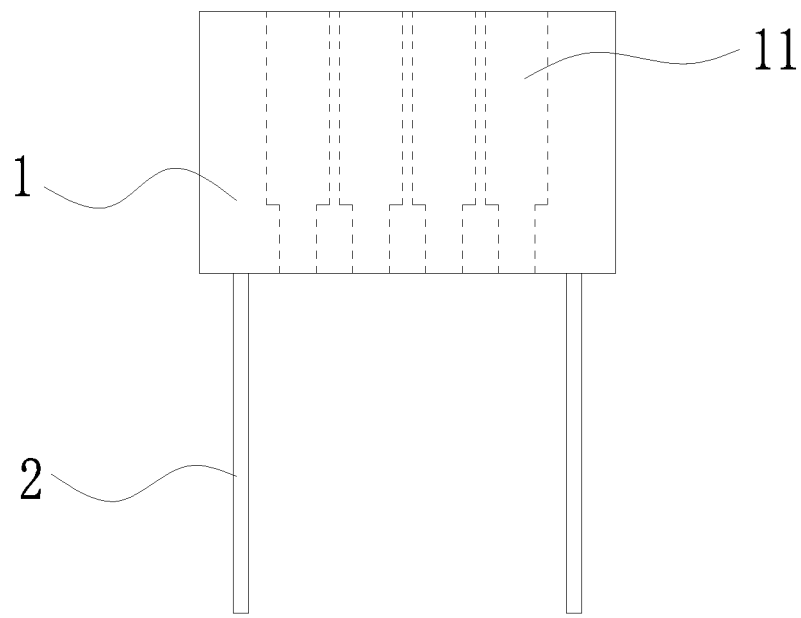
FIG. 38 is a front view of a fourth alternative solution to the internal shapes of the through airflow holes shown in FIG. 1.
Figure 39:
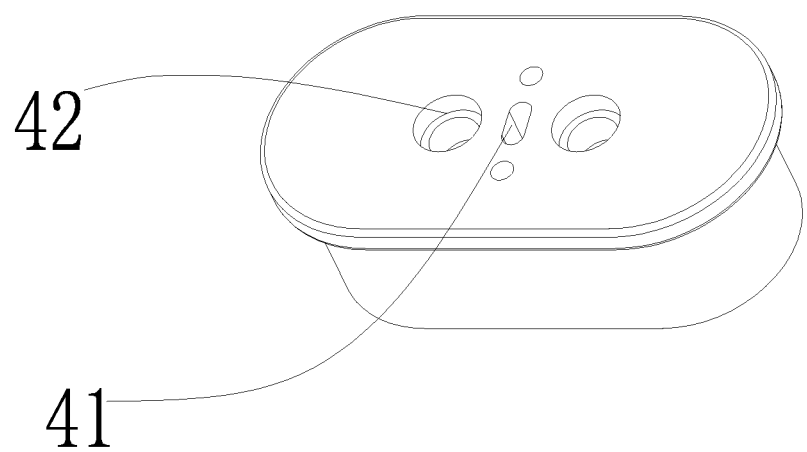
FIG. 39 is a schematic diagram of a base.

In some embodiments, as shown in FIG. 37 as the third alternative to the front view of the through airflow hole 11, the through airflow hole 11 has a taper shape with a wide upper portion and a narrow lower portion. The main purpose of such a structure is to solve the problem of liquid leakage caused by falling due to gravity action when some thinner liquid is conducted to the inner wall of the through airflow holes 11, or the problem of poor user experience caused by the non-atomized liquid to move up with the airflow into the user's mouth due to the fact that the atomized liquid moves upwards carried by the airflow when the user applies relatively large suction force. The through airflow channel with a wide upper portion and a narrow lower portion can effectively solve the above-mentioned problems, so that force of the airflow on the liquid in the inner wall of the through airflow holes 11 is reduced when the user is inhaling. The step shaped airflow channel with a wide upper portion and a narrow lower portion shown in FIG. 38, in actual implementation, can effectively settle the problem of liquid leakage and liquid absorption into the user's mouth. The advantage of such structure is that the air intake is reduced while the atomization area remains unchanged, which makes the thermal efficiency higher, ensures the effect of the atomized steam and improves the user experience.

Figure 30:
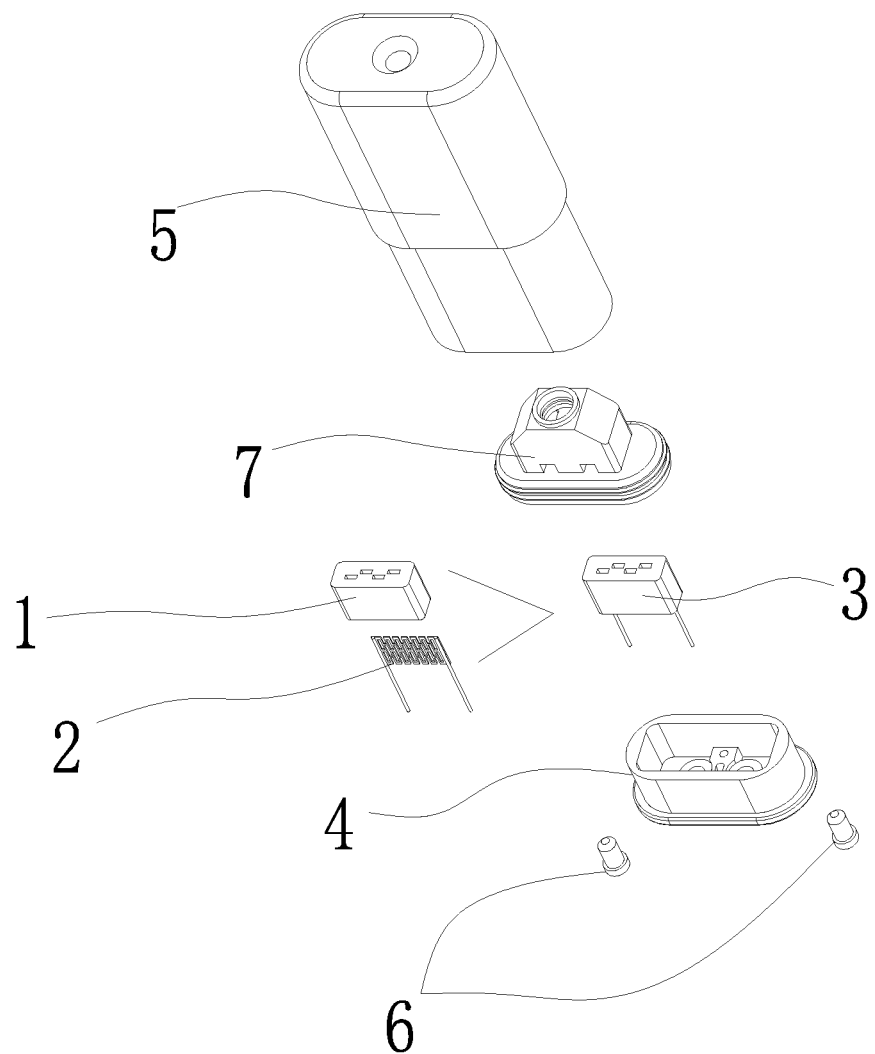
FIG. 30 is a three-dimensional exploded view of a mesh-shaped sheet-type porous heating atomizer.

FIG. 30 is a three-dimensional schematic diagram of the atomizer in some embodiments. In the embodiment, the atomizer may be assembled by the following steps:

Step (1): inserting the porous liquid conducting and heating assembly into the oil-locking silicone 7;

Step (2): assembling the oil-locking silicone 7 to the base 4, with the two electrode connecting wires of the porous heating assembly passing through the electrode mounting holes 42 of the base 4 respectively;

Step (3): pressing the two electrode columns 6 into the electrode mounting holes 42 of the base 4;

Step (4): filling the oil reservoir 5 with liquid, and mounting the installed base 4 and silicone into the oil reservoir 5.

Such assembly method has fewer parts and components. The assembly is very convenient and fast, and automatic assembly can be realized.

Figure 31:
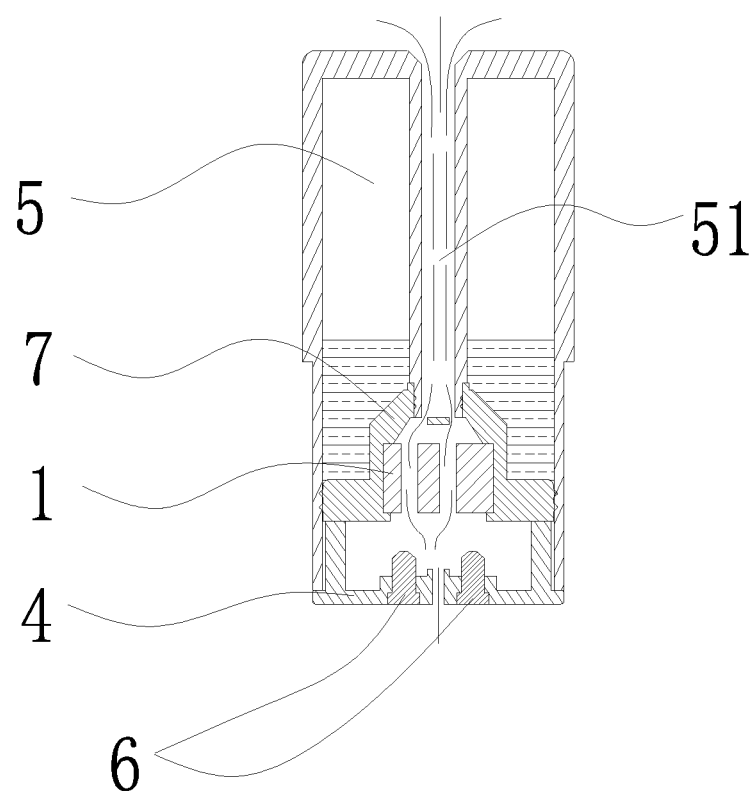
FIG. 31 is a sectional diagram and an airflow direction view in a front view of the mesh-shaped sheet-type porous heating atomizer.
Figure 32:
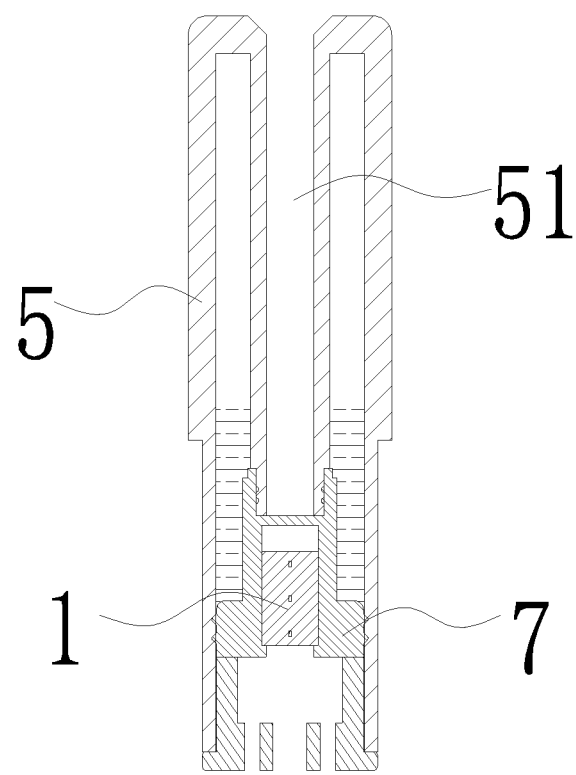
FIG. 32 is a sectional diagram in a side view of the mesh-shaped sheet-type porous heating atomizer.
Figure 33:
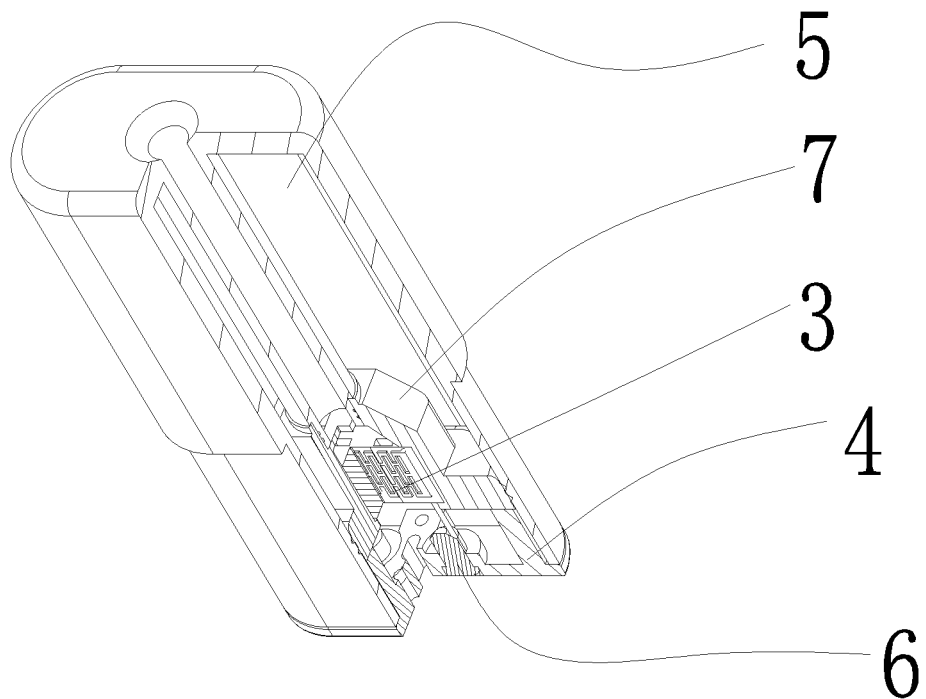
FIG. 33 is a partial sectional diagram in a three-dimensional view of the mesh-shaped sheet-type porous heating atomizer.

FIG. 31 shows the schematic diagram of the working principle and the airflow direction of the atomizer. When the user inhales at the air outlet channel 51 of the oil reservoir 5, the air induction switch is triggered, the two ends of the electrodes are powered, and the planar sheet-like electric heating track 2 generates heat, which heats and atomizes the liquid at the planar sheet-like electric heating track 2 conducted from the oil reservoir 5 to the porous liquid conducting member 1 via the liquid inlet hole of the silicone into atomized steam. The air entering through the air inlet of the base 4 passes through the planar sheet-like electric heating track 2 of the porous liquid conducting and heating and atomizing assembly to carry the atomized steam to flow out from the air outlet channel 51 of the oil reservoir 5.

In some embodiments of the present disclosure, the through airflow holes 11 in the porous liquid conducting member 1, the shape and position of the planar sheet-like electric heating track 2, and the net-shaped structure and the corresponding application scenarios of the planar sheet-like electric heating track 2 are clearly described. The above embodiments illustrate the differences, advantages and disadvantages therebetween, and can be used for replacing and in combination with each other.

The beneficial effects of the present disclosure: the present disclosure provides a mesh-shaped sheet-type porous heating and atomizing assembly that are beneficial to mass production, uniform heating, large atomization area, and large amount of smoke, and a heating atomizer therewith; the product has a simple structure which is beneficial for assembly, and a good consistency in atomization effect, and solves the problems of poor consistency of the liquid conducting material, poor adjustment of the volume of oil input, lack of heating power control of each needed areas in traditional heating element, discontinuous matching of the heating area and the air flow channel, invalid heating areas existed, low efficiency in atomizing liquid using heat energy converted from electric energy of traditional heating element, and so on. The disclosure has simple design structure, fewer components, strong structural strength of each component, and is not easily deformed in the assembly process. Hence, the manufactured final product has high consistency, and is conducive to automated production, and improves production efficiency.

The above is a detailed description of the preferred embodiments of the present disclosure, but the disclosure is not limited to the described embodiments. Those skilled in the art can make various equivalent modifications or substitutions without departing from the spirit of the present disclosure. These equivalent modifications or replacements are all included in the scope defined by the claims of this application.

What is claimed is:

1. A mesh-shaped sheet-type porous heating and atomizing assembly comprising a porous liquid conducting member (1) configured to absorb and conduct liquid and a planar sheet-like electric heating track (2) arranged in the porous liquid conducting member (1);

wherein the planar sheet-like electric heating track (2) is configured to heat and atomize the liquid;

wherein multiple through airflow holes (11) are defined in the porous liquid conducting member (1), and the planar sheet-like electric heating track (2) is configured to be a planar heating net composed of multiple heating tracks connected in parallel;

wherein the through airflow holes (11) in the porous liquid conducting member (1) are distributed on one or two sides of the one planar sheet-like electric heating track (2); and wherein each of the through airflow holes (11) in the porous liquid conducting member (1) comprises at least one flat planar inner wall surface, the planar sheet-like electric heating track (2) is inlaid in an inner wall of the porous liquid conducting member (1) and is approximately parallel to the flat planar inner wall surfaces of the through airflow holes (11), and a distance between the planar sheet-like electric heating track (2) and the flat planar inner wall surfaces is 0-0.5 mm.

2. The mesh-shaped sheet-type porous heating and atomizing assembly according to claim 1, wherein the porous liquid conducting member (1) is provided with one or more through airflow holes (11) extending vertically or laterally.

3. The mesh-shaped sheet-type porous heating and atomizing assembly according to claim 1, wherein the through airflow holes (11) in the porous liquid conducting member (1) have a straight tubular shape, a taper shape with a wide upper portion and a narrow lower portion, a taper shape with a narrow upper portion and a wide lower portion, a step shape with a wide upper portion and a narrow lower portion, or a step shape with a narrow upper portion and a wide lower portion.

4. The mesh-shaped sheet-type porous heating and atomizing assembly according to claim 1, wherein the through airflow holes (11) in the porous liquid conducting member (1) are distributed in between two said planar sheet-like electric heating tracks (2).

5. The mesh-shaped sheet-type porous heating and atomizing assembly according to claim 1, wherein the multiple through airflow holes (11) all have a same size, or have sizes larger in the middle and smaller on two sides thereof.

6. The mesh-shaped sheet-type porous heating and atomizing assembly according to claim 1, wherein the multiple through airflow holes (11) are equidistantly spaced, or are distributed densely in the middle and sparsely on two sides thereof.

7. The mesh-shaped sheet-type porous heating and atomizing assembly according to claim 1, wherein two ends of the planar sheet-like electric heating track (2) each is provided with one electrical connection portion, and each electrical connection portion extends from an outer wall of the porous liquid conducting member (1); and the electrical connection portions are wire-like lead electrodes or sheet-like contact electrodes.

8. A mesh-shaped sheet-type porous heating atomizer, comprising a mesh-shaped sheet-type porous heating and atomizing assembly (3) which comprises a porous liquid conducting member (1) configured to absorb and conduct liquid and a planar sheet-like electric heating track (2) arranged in the porous liquid conducting member (1);

wherein the planar sheet-like electric heating track (2) is configured to heat and atomize the liquid;

two rows of through airflow holes (11) are defined in the porous liquid conducting member (1) and located at opposite sides of the planar sheet-like electric heating track (2) respectively, and each row of through airflow holes (11) comprises multiple through airflow holes (11); and the planar sheet-like electric heating track (2) is configured to be a planar heating net composed of multiple heating tracks connected in parallel, and the planar heating net is located between the two rows of through airflow holes (11).

9. The mesh-shaped sheet-type porous heating atomizer according to claim 8, wherein the mesh-shaped sheet-type porous heating atomizer further comprises a base (4) and an oil reservoir (5), the mesh-shaped sheet-type porous heating and atomizing assembly (3) is disposed in the oil reservoir (5), and the base (4) is arranged on an opening of the oil reservoir (5) and limits the mesh-shaped sheet-type porous heating and atomizing assembly (3) to be within the oil reservoir (5); and a first electrode (61) and a second electrode (62) are arranged on the base (4), and contact ends of the first electrode (61) and the second electrode (62) extend into the oil reservoir (5) and are electrically connected to two ends of the planar sheet-like electric heating track (2), respectively.

10. The mesh-shaped sheet-type porous heating atomizer according to claim 9, wherein an air inlet (41) is defined in the base (4), and the air inlet (41) is communicated with a space where the planar sheet-like electric heating track (2) is located; and
an air outlet channel (51) is defined in the oil reservoir (5), and the air outlet channel (51) is communicated with the space where the planar sheet-like electric heating track (2) is located.

11. The mesh-shaped sheet-type porous heating atomizer according to claim 9, wherein electrode mounting holes (42) are defined in the base (4), and the first electrode (61) and the second electrode (62) are respectively disposed in the electrode mounting holes (42).

12. The mesh-shaped sheet-type porous heating atomizer according to claim 9, wherein the mesh-shaped sheet-type porous heating atomizer further comprises an oil-locking silicone (7) sleeved on an upper surface and a side portion of the mesh-shaped sheet-type porous heating and atomizing assembly (3), and an outer side wall of the oil-locking silicone (7) is in a sealed connection with an inner wall of the oil reservoir (5).

13. The mesh-shaped sheet-type porous heating atomizer according to claim 8, wherein the porous liquid conducting member (1) is provided with one or more through airflow holes (11) extending vertically or laterally.

14. The mesh-shaped sheet-type porous heating atomizer according to claim 8, wherein the through airflow holes (11) in the porous liquid conducting member (1) have a straight tubular shape, a taper shape with a wide upper portion and a narrow lower portion, a taper shape with a narrow upper portion and a wide lower portion, a step shape with a wide upper portion and a narrow lower portion, or a step shape with a narrow upper portion and a wide lower portion.

15. The mesh-shaped sheet-type porous heating atomizer according to claim 8, wherein the through airflow holes (11) in the porous liquid conducting member (1) are distributed on one or two sides of one planar sheet-like electric heating track (2); or
the through airflow holes (11) in the porous liquid conducting member (1) are distributed in between two planar sheet-like electric heating tracks (2).

16. The mesh-shaped sheet-type porous heating atomizer according to claim 8, wherein at least one inner wall surface of the through airflow holes (11) in the porous liquid conducting member (1) is a flat planar surface, the planar sheet-like electric heating track (2) is inlaid in an inner wall of the porous liquid conducting member (1) and is approximately parallel to the flat planar inner wall surface of the through airflow holes (11), and a distance between the planar sheet-like electric heating track (2) and the flat planar inner wall surface is 0-0.5 mm.

17. The mesh-shaped sheet-type porous heating atomizer according to claim 8, wherein the through airflow holes (11) all have a same size, or have sizes larger in the middle and smaller on two sides thereof.

18. The mesh-shaped sheet-type porous heating atomizer according to claim 8, wherein the through airflow holes (11) are equidistant spaced, or are distributed densely in the middle and sparsely on two sides thereof.

* * * * *